Oct. 24, 1950   C. G. MUEHLFELD   2,527,324
COMBINATION FOUNTAIN FEEDER FOR POULTRY
Filed Aug. 6, 1949   3 Sheets-Sheet 1
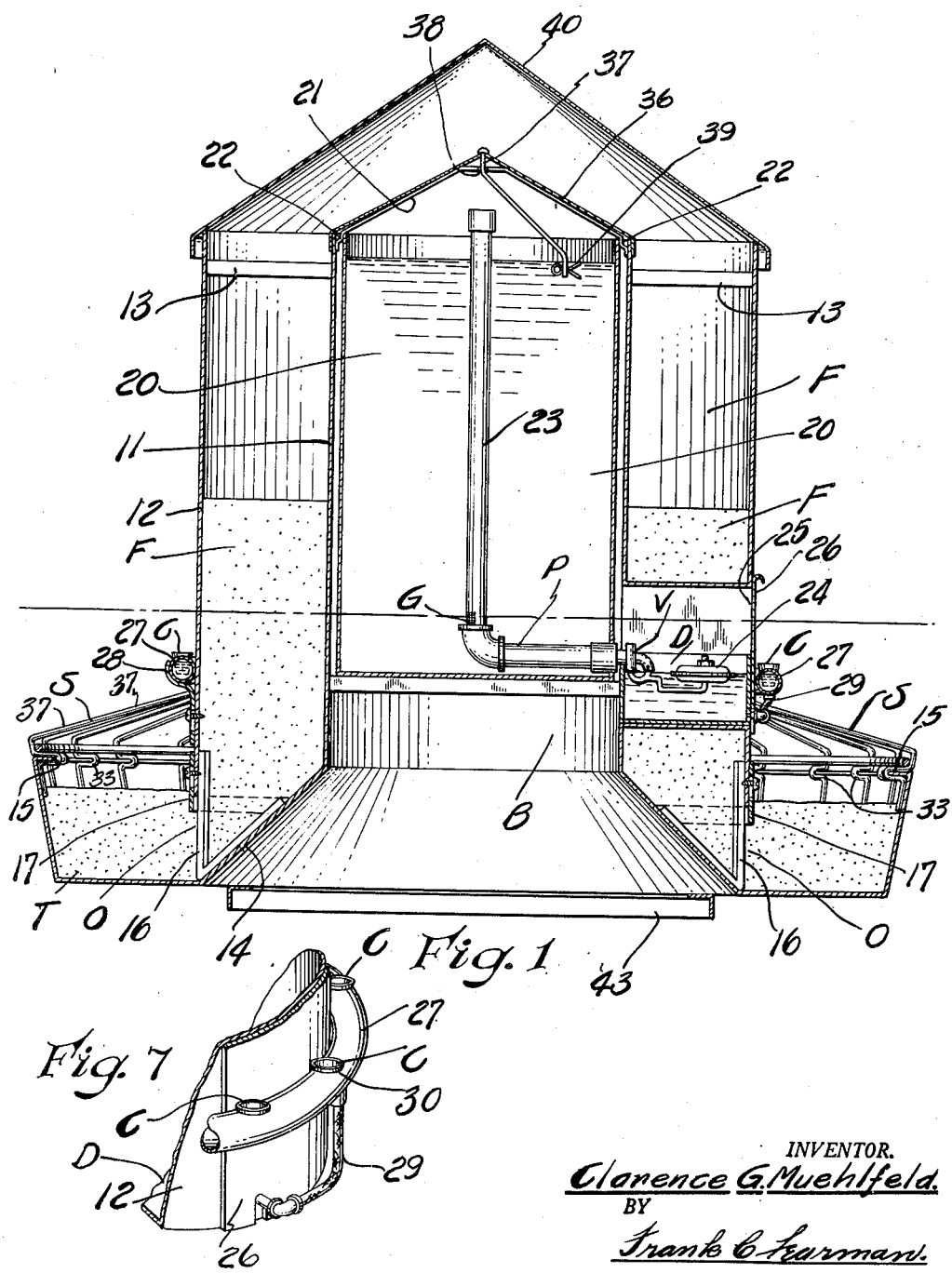
INVENTOR.
Clarence G. Muehlfeld.
BY
Frank C. Fearman.
ATTORNEY

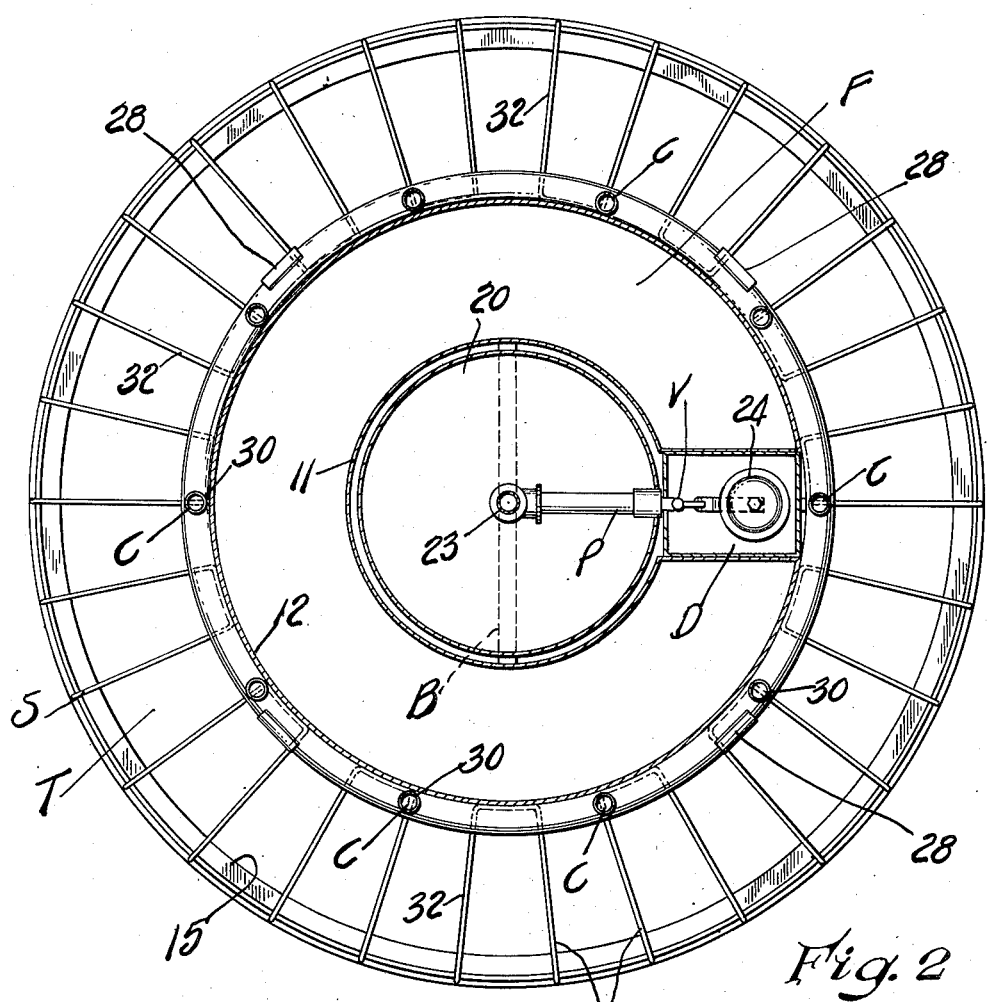
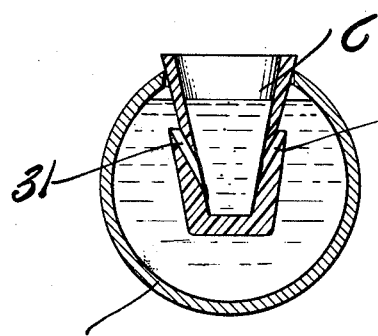

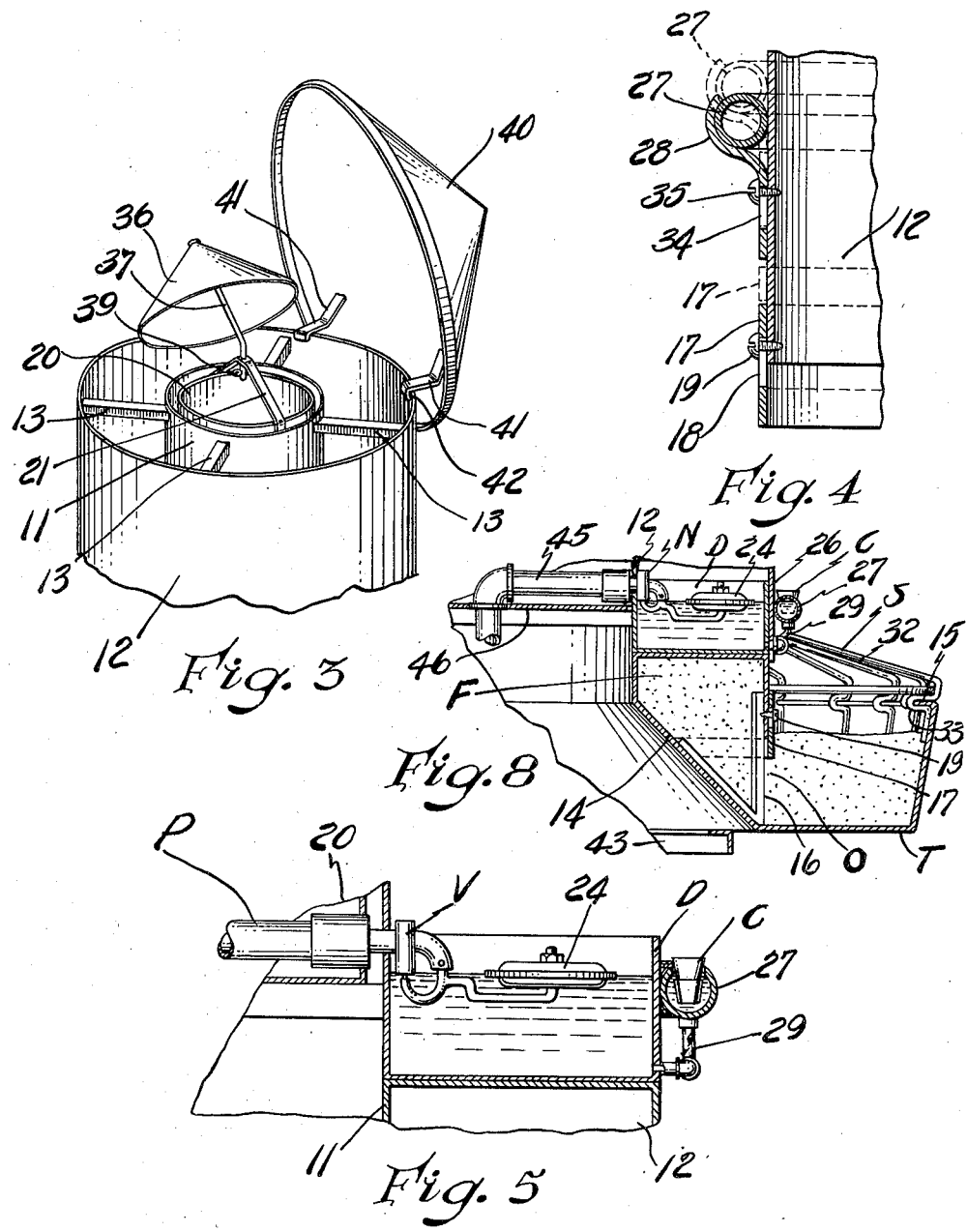

Patented Oct. 24, 1950

2,527,324

UNITED STATES PATENT OFFICE 2,527,324

COMBINATION FOUNTAIN FEEDER FOR POULTRY

Clarence G. Muehlfeld, Bridgeport, Mich.

Application August 6, 1949, Serial No. 108,915

15 Claims. (Cl. 119—51.5)

This invention relates to new and useful improvements in fountain feeders for poultry of all kinds, and has as its foremost object to provide a simple and efficient device which will at all times automatically provide an adequate and accessible supply of feed and water for the poultry.

Another object of my invention is to provide a large capacity fountain feeder of the above-mentioned character which will be self-regulating to the extent that water and feed are fed continuously to the poultry as required, no attention being necessary except to replenish the feed and water supply when exhausted.

Still another object is to provide a device which segregates the water and the feed, and provide a plurality of individual fountain drinking cups associated with the water supply, the level of the water in the cups eliminating the possibility of spillage into the feed or into the surrounding litter and bedding, thus eliminating unhealthful and germ-breeding living conditions for the poultry.

A further object of my invention is to provide a filtered inlet orifice in the water supply system to eliminate any possibilities of foreign matter or sediment getting into the water and thence into the individual cups, eliminating clogging of the inlet passages in the cups and insuring a clean supply at all times.

A further object of my invention is to provide means wherein the water level and the drinking cups can be adjusted to suit the different types and size of fowl.

Still a further object is to provide means associated with the feed trough so that there will be no undue crowding or bickering of the poultry when drinking and eating, each of the chickens being able to supply itself with sufficient food and fresh water at any time and without moving from its position at the feeder.

A further object still is to space the water container in the feeder to provide for circulation of air, thus eliminating condensation and further assisting in maintaining the water at proper temperature at all seasons.

Still a further object is to provide easily removable, individual fountain cups in the water supply line, which cups can be easily and quickly removed when desired, without closing off the water and/or feed supply.

A further advantage of my invention is to provide a cover for the feed compartment, and provide means thereon for releasable engagement with the upper rim of the feed compartment, so that it can be shifted to tilted position and so held on the feeder, eliminating the necessity of bending to place it on the floor where it comes into contact with litter etc., and further eliminating the necessity of bending to lift it from the floor when placing it in position.

A further object of my invention is to provide a cover for the water receptacle and means whereby it can be raised and swung to off-center position to permit filling and/or inspection of the receptacle, said cover being so formed that when in closed position the feed can be dumped thereon, the conical-shape of the cover uniformly distributing the feed to all parts of the feed trough.

A further object is to provide a substantial device of the above-mentioned character which is relatively light in weight and which can be economically manufactured and readily assembled.

Other advantages and objects will become apparent during the course of the following description.

In the drawings:

Fig. 1 is a central, sectional, elevational view of my improved poultry fountain feeder.

Fig. 2 is a sectional, plan view taken on the line 2—2 of Fig. 1.

Fig. 3 is an isometric, fragmentary view of the top section of the fountain feeder showing both covers in open position.

Fig. 4 is an enlarged, fragmentary, sectional, elevational view of my fountain feeder, the broken lines illustrating the adjustment of the feed trough band and also the vertical adjustment of the water supply pipe.

Fig. 5 is a fragmentary, sectional, elevational view showing the water level regulating mechanism.

Fig. 6 is an enlarged, sectional, elevational view of one of the individual fountain drinking cups showing it in position in the water supply line;

Fig. 7 is a fragmentary, isometric view illustrating the connection of the water supply tank to the water line.

Fig. 8 is a fragmentary view showing an alternate construction in which a pressure system is the source of water supply.

Referring now more specifically to the drawings in which I have shown the preferred embodiment of my invention, the letter F designates the feed storage chamber of the device, and comprises spaced-apart concentrically arranged shells 11 and 12, having spacer bars 13 on the upper end thereof, the lower end of the inner shell being secured to a conical-shaped section 14 which extends outwardly and upwardly as shown to form a T, the upper end of the trough terminating in an inwardly turned rim section 15 which serves to reinforce the trough and form a mounting for the separators S, all as will be hereinafter more fully described.

Circumferentially spaced, angularly-shaped spacing brackets 16 are mounted on the conical-shaped section 14 and supports the shell 12 above the bottom of the trough, thus forming a feed discharge opening O through which feed flows from the feed chamber F to the trough.

A vertically adjustable circular band 17 is mounted on the lower end of the shell 12, and is formed with vertical slits 18 which accommodate screws 19 for securing the band in adjusted position, said band controlling the discharge openings O to regulate the flow of feed from the storage chamber to the trough.

A bar support B spans the inner shell 11 at a point directly adjacent the upper end of the member 14, and a preferably cylindrical water receptacle 20 is mounted thereon, this receptacle being in concentric relation with said shell and a bail 21 is secured to the upper end thereof, the ends of the bail being bent as at 22 to space the walls of the inner shell and the receptacle to provide for circulation of air therebetween.

A centrally disposed stand pipe 23 is provided in the water receptacle 20 as shown, the lower end P extending horizontally through the side wall thereof and into a tank D provided between the concentric shells 11 and 12, said tank being of limited volume and is readily removable when desired.

A conventional float valve arrangement is provided in the tank D and includes a float 24 for automatically actuating the valve V provided on the pipe P when the water in the tank drops below a predetermined level, and a screened orifice G is provided in the stand pipe to admit water and screen out any sediment or foreign matter.

An opening 25 is provided in the side wall of the outer shell 12, and a removable plate 26 forms a closure for said opening and permits access thereto when desired.

A circular pipe 27 encircles the outer shell 12 and is held in position by means of brackets 28, a flexible pipe connection 29 connecting the pipe 27 with the tank D, and a plurality of openings 30 are provided in said pipe to accommodate individual fountain cups C, these cups being thimble-shaped as clearly shown in Fig. 6 of the drawings, and are provided with inclined intake passages 31 (see Fig. 6), the upper ends of which are normally below the water level in the pipe so that the cup is filled with water to a predetermined level at all times.

The cup is of ample size to accommodate the bill of the chicken, but is too small to permit entrance of the chicken's gills; consequently, the chicken's gills do not become soaked with water and drip on the litter and floor surrounding the feeder as the chicken drinks. The upper end of the cup C projects above the top of the pipe 27 and can be made up of any desired material such as plastic, metal or the like, and it can be of of any desired color.

The size of the cup C and the location of the inlet passages 31 is of prime importance, because should feed adhere to the chicken's bill and drop into the cup, it will be automatically drawn in (because of the limited area of the cup) by the chicken on the next sip. There can be no plugging of the inlet passage because the flow of water is inward into the cup, nor can it be carried into the supply pipe, thus insuring clean water at all times.

Spacer brackets S are provided around the outer rim of the trough T, each bracket comprising an inclined U-shaped section 32 extending across the open top of the trough and bearing against the side walls of the outer shell 12, the free end of the brackets being turned downwardly and crimped as at 33 to resiliently engage the inwardly projecting rim 15 of the trough. These brackets serve to keep the poultry out of the trough and prevent crowding. One of the fountain cups is within easy reach of any one of the chickens at any point around the circumference of the trough.

The above-described arrangement permits the poultry standing on the outside to reach between the brackets S and alternate between mouthfuls of feed and water, and this is especially advantageous because the feed is usually dry and sticks in the chicken's throat, and the sips of water serve to aid in swallowing and the digestion of the high-powered feeds at present in general use. As the chickens drink from the cups, the water level in the tank is lowered and the float valve in the tank D automatically admits additional water to bring the tank to proper level. Thus, a fresh supply of water is assured at all times, and the water in the cups is maintained at a predetermined level.

The supply pipe 27 is vertically adjustable on the shell 12, a slitted opening 34 being provided in the brackets 28, and screws 35 serve to secure the brackets in set position.

A conical-shaped cover 36 forms a closure for the open end of the water receptacle 20 and fits over the upper end of the shell 11, a rod 37 being mounted in the apex thereof and extending through an opening 38 provided in the bail 21; thence the rod extends at an angle, and the lower end is again offset, and a pin 39 is mounted in said lower end.

This permits the cover to be raised as illustrated in Fig. 3 of the drawings, the bent rod 37 holding the cover off-center so that the water tank can be readily filled, and when the cover is lowered, it forms a conical surface over which feed can be poured, so that it cascades down and is uniformly distributed in the circular feed chamber.

Another conical-shaped cover 40 forms a closure for the entire feeder and fits over the outer shell 12, hook-shaped retaining clips 41 being provided on the inner face thereof, and the hook ends 42 are hooked over the upper rim of the shell 12 with the edge of the cover bearing against the side wall of said outer shell, thus holding it in position, making it unnecessary to lean over to place or pick up the cover from the floor, and also retaining it clean and free of litter at all times.

The device can be mounted on a frame or other support 43 so that the bottom is clear of the floor, permitting air to freely circulate therebetween, and this support can be of any desired size and shape.

To supply the device with feed and water, the cover 40 is first lifted and placed as illustrated in Fig. 3 of the drawings; the feed is then poured over the cover 36, cascading over the conical surface so that it is uniformly distributed in the feed receptacle F. The cover 36 is then raised to position shown in Fig. 3 so that the water receptacle can be filled by a hose or pails (not shown), as desired. When the receptacle is filled, the cover 36 is replaced, the upper cover 40 is then lowered and the device is then ready for use. The poultry clusters around the trough, eating the feed and drinking without moving from the trough, and due to its circular design, a large number of chickens can be accommodated. The capacity of the water tank and feed container is sufficient to provide a supply for a week or more without refilling or other attention, and there can be no wastage due to the construction of the feed trough and water cups.

In Fig. 8 of the drawings I have shown a slightly different construction in which the water receptacle is eliminated and the pipe 45 is mounted on a suitable support 46, the pipe line being connected direct to a conventional pressure water system (not shown). This eliminates the water receptacle and the filling thereof, and the operation is exactly the same as previously described.

From the foregoing description, it will be obvious that I have perfected a very simple, practical and economical fountain feeder for use by poultry raisers in general.

What I claim is:

1. A combination fountain feeder comprising a water receptacle concentrically arranged, spaced-apart inner and outer shells surrounding said receptacle and forming a feed chamber therebetween, a trough surrounding said outer shell and open to said feed chamber, a tank between the concentrically arranged shells and connected to said water receptacle, a water pipe surrounding said outer shell above said trough and connected to said tank, means for maintaining a predetermined level of water in said tank and pipe, and a plurality of openings in said pipe.

2. The combination defined in claim 1 in which fountain cups are provided in the openings in said pipe, and inlet passages in said cups at a point spaced from the lower end thereof for admitting water to said cups.

3. The combination set forth in claim 1 in which separating brackets are detachably connected to the rim of the trough with the upper ends extending across the trough and bearing against the wall of the outer shell.

4. The combination defined in claim 1 in which a vertically disposed pipe is provided in said water receptacle with its lower end connected to said tank, and a float valve in said tank and connected to said pipe for admitting water to the tank when the tank level drops below a predetermined point.

5. A combination fountain feeder comprising a main water receptacle, spaced-apart concentrically arranged cylindrical shells surrounding said receptacle and forming a feed chamber therebetween, a trough surrounding said outer shell, a water tank between the inner and outer shell, a pipe in said main water receptacle and connected with said tank, means for automatically maintaining the water in said tank at a predetermined level, a circular pipe surrounding the outer shell and communicating with said tank, a plurality of openings in said pipe, an individual fountain cup mounted in each opening and provided with an inlet port therein at a point spaced above the bottom thereof for supplying water from the pipe to said cups.

6. The combination defined in claim 5 in which a vertically adjustable band controls the size of the opening from the feed chamber to said trough.

7. The combination set forth in claim 5 which includes means for vertically adjusting the circular water pipe on the shell.

8. The combination as defined in claim 5 in which the lower end of the inner concentrically arranged shell is outwardly flared, and brackets mounted on the flared surface for supporting the outer shell.

9. The combination defined in claim 5 in which a bail is provided on the water receptacle with the ends of the bail being bent outwardly to space the receptacle from the inner concentric shell.

10. A combination fountain feeder comprising a water receptacle, spaced-apart concentrically arranged inner and outer shells surrounding said receptacle and forming a feed chamber therebetween, a feed trough surrounding said outer shell and open to said feed chamber, adjustable means for regulating the size of said opening, a tank between the inner and outer shells and connected to said receptacle, a valve interposed in the connection between the receptacle and the tank for admitting water thereto to maintain it at a predetermined level, a pipe encircling said outer shell and connected to said tank, and fountain cups mounted in said pipe in circumferential spaced relation.

11. The combination set forth in claim 10 in which a bail is provided on the water receptacle, and a conical-shaped cover mounted on said bail and movable to off-center raised position to permit unobstructed access to said receptacle.

12. The combination as defined in claim 10 in which a conical-shaped cover forms a closure for the feeder, and clips on said cover and engageable with the upper rim of the outer shell to releasably secure it in position on the feeder.

13. The combination as recited in claim 10 in which a stand pipe is provided in the water receptacle and connected to said tank, a screened orifice in said stand pipe immediately adjacent the lower end thereof, and means for automatically admitting water from said receptacle to said tank.

14. A combination fountain feeder comprising spaced-apart, concentrically arranged inner and outer shells forming a chamber therebetween, a trough surrounding the outer shell and open to said feed chamber, means for adjusting the size of said opening, removable brackets mounted on said trough and extending over the open upper end thereof, a water receptacle mounted on the inner shell, a tank provided between the inner and outer shells and communicating with said receptacle, a stand pipe in said receptacle and forming the connection between the receptacle and the tank, a screened intake orifice in said stand pipe, a circular pipe surrounding the outer shell and connected to said tank, fountain cups mounted in said pipe in spaced relation, and intake ports in said cups at a point spaced above the bottom wall thereof.

15. A combination fountain feeder comprising inner and outer shells forming a feed chamber therebetween, a trough surrounding the outer chamber and open to the lower end of said feed chamber, a tank between the inner and outer shell, a pipe connected to a source of water supply and open to said tank, a valve in said pipe for admitting water to the tank when the water therein recedes below a predetermined level, a pipe embracing said outer shell and connected to said tank for admitting liquid thereto, and a plurality of openings in the upper face of said encircling pipe.

CLARENCE G. MUEHLFELD.

No references cited.